(12) United States Patent
Parmentier et al.

(10) Patent No.: US 12,352,205 B2
(45) Date of Patent: Jul. 8, 2025

(54) TURBOJET WITH IMPROVED AIR EXTRACTION PERFORMANCE

(71) Applicant: SAFRAN, Paris (FR)

(72) Inventors: Nicolas Claude Parmentier, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/249,417

(22) PCT Filed: Oct. 19, 2021

(86) PCT No.: PCT/FR2021/051812
§ 371 (c)(1),
(2) Date: Apr. 18, 2023

(87) PCT Pub. No.: WO2022/084614
PCT Pub. Date: Apr. 28, 2022

(65) Prior Publication Data
US 2024/0110523 A1    Apr. 4, 2024

(30) Foreign Application Priority Data
Oct. 19, 2020    (FR) ...................................... 2010716

(51) Int. Cl.
*F02C 6/08*    (2006.01)
*F02C 9/18*    (2006.01)

(52) U.S. Cl.
CPC . *F02C 6/08* (2013.01); *F02C 9/18* (2013.01)

(58) Field of Classification Search
CPC ..................................... F02C 9/18; F02C 6/08
See application file for complete search history.

(56) References Cited

U.S. PATENT DOCUMENTS

| | | |
|---|---|---|
| 2013/0051426 A1 | 2/2013 | Gaully et al. |
| 2017/0044991 A1* | 2/2017 | Suciu .................... F04D 29/701 |
| 2018/0283282 A1* | 10/2018 | Pointon .................... F02K 3/06 |
| 2019/0186381 A1 | 6/2019 | Suciu et al. |

FOREIGN PATENT DOCUMENTS

EP    3 091 210 A1    11/2016

OTHER PUBLICATIONS

International Search Report issued Jan. 21, 2022 in PCT/FR2021/051812 filed on Oct. 19, 2021, 2 pages.

* cited by examiner

*Primary Examiner* — Todd E Manahan
*Assistant Examiner* — Alyson Joan Harrington
(74) *Attorney, Agent, or Firm* — Oblon, McClelland, Maier & Neustadt, L.L.P.

(57) ABSTRACT

A turbojet includes in succession, from upstream to downstream in the flow direction of a primary air stream: a low-pressure casing, an intermediate casing, and a high-pressure casing that are longitudinally aligned and which jointly delimit an internal annular passage for the circulation of the air stream. The intermediate casing delimits a portion of the annular passage called a gooseneck and includes: an air discharge system able to extract air from the air stream circulating in a first zone of the gooseneck and to discharge it outside the passage, and an air extraction system able to extract air circulating in a second zone of the gooseneck for an air conditioning system, the second air extraction zone being located downstream of the first air extraction zone.

7 Claims, 2 Drawing Sheets

TURBOJET WITH IMPROVED AIR EXTRACTION PERFORMANCE

TECHNICAL FIELD

The present disclosure relates to a turbojet, particularly for aircraft.

PRIOR ART

Aircraft turbojets called two-spool turbojets, comprising a first low-pressure (BP) compressor-turbine spool and a second high-pressure (HP) compressor-turbine spool, are known.

This type of turbojet generally integrates, downstream of the variable-pitch stages of the high-pressure (HP) compressor, an air extraction system intended to feed an aircraft air conditioning system. One example of a turbojet of this type is described in patent application FR 2 860 041.

The extraction of air carried out in this zone of the turbojet allows air to be extracted at a sufficiently high pressure to be able to be used in an aircraft air conditioning system, taking into account the current operating constraints of a system of this type.

However, aircraft air conditioning systems tend to evolve toward systems which will require less and less extraction pressure. It would therefore be useful to design a new turbojet configuration allowing air to be extracted, for an aircraft air conditioning system, at a lower pressure than that considered above.

DISCLOSURE OF THE INVENTION

The present invention thus has as its object an aircraft turbojet comprising in succession, from upstream to downstream in the circulation direction of a primary air stream, a low-pressure casing, an intermediate casing and a high-pressure casing which are aligned entirely in a longitudinal direction XX', the low-pressure, intermediate and high-pressure casings jointly delimiting an internal annular passage for the circulation of the primary air stream from upstream to downstream, the intermediate casing comprising a portion of said annular passage which is called a gooseneck, the intermediate casing comprising:

- an air discharge system VBV which is able to extract air from the primary air stream circulating in a first zone Z1 of the gooseneck and discharge it outside the annular passage,
- an air extraction system which is able to extract air from the primary air stream circulating in a second zone of the gooseneck, the extracted air being intended for an aircraft air conditioning system ECS, the second air extraction zone Z2 being located downstream of the first air extraction zone Z1,
- in the second air extraction zone Z2 of the gooseneck, several arms which extend radially and with a circumferential distribution in the gooseneck when viewed in a transverse plane relative to the longitudinal direction XX', the air extraction system comprising at least a part of these arms, each of which is configured to extract air from the second zone Z2 by means of at least one slot and to route this extracted air, said at least one slot extending from the base of the configured arm, in its radial extension direction, over a distance which represents between 30 and 70% of the total radial extension of the configured arm.

By positioning the air extraction system ECS at the gooseneck, the pressure of the air extracted in the primary air stream at this location is less than the pressure of the air that would be extracted from this stream downstream of the compressor of the high-pressure casing. The air is extracted in a second zone distinct from the first zone and located downstream of the latter in order not to interfere with the extraction of the first zone. The air extraction system of the second zone is thus distinct from the air discharge system VBV which is able to extract air in the first zone.

The air extraction which is thus accomplished between the low-pressure casing and the high-pressure casing allows reducing the necessary cross section for the passage of air (in the annular passage) toward the compressor of the high-pressure casing, more particularly in the zone located between the gooseneck and the high-pressure extraction port of the prior art (a port which is generally located downstream of the variable-pitch stages of the high-pressure casing). This reduction of the passage cross section can offer several design possibilities:

- reducing the external radius of the primary air stream in line with the gooseneck and thereby reducing the diameter of the turbojet;
- reducing the length of the gooseneck for the same slope of the gooseneck (the outer radius remains identical, but the inner radius is raised toward the outer radius), which allows reducing the overall load of the high-pressure compressor;
- reducing the slope of the gooseneck for the same length of the gooseneck, which further limits the air flow separations at the gooseneck and reduces pressure losses in this zone.

It will be noted that the air extraction system is configured independently of the air discharge system in order to be able to extract air without depending on the air discharge system, which is used during different flight phases of the aircraft. In particular, from each distinct zone where the air is extracted by one of the two systems, the air extracted by one system is no longer in contact with the air extracted by the other system.

Air extraction at the base of the configured arms allows capturing air in a zone of the air stream that is less polluted by particles (ice, hail, water, sand . . . ), which allows supplying less polluted air to the air conditioning system and thus protecting it from deterioration, from fouling and from plugging. Thus a particle trap is generally not necessary.

According to other possible features:

- the slot is arranged at the leading edge of the configured arm; this air inlet arrangement allows maximizing the recovery of dynamic pressure and thus increasing the pressure level of the air extracted in this zone;
- in a transverse section view relative to the radial extension direction of the configured arm, the leading edge assumes locally the shape of two facing parallel inlet lips, which are spaced from one another so as to provide between them the slot allowing extracting air from the second zone and introducing it into the configured arm;
- each of the configured arms comprises an internal routing duct to route the extracted air through the slot inside said arm and to an outlet opening belonging to it;
- the air extraction system ECS comprises at least one air manifold which is fluidly isolated from the air discharge system VBV; the fluid isolation (sealing) of the manifold(s) with respect to the air discharge system VBV allows air which is extracted by the air discharge system not to penetrate into the air manifold, thus avoiding polluting the air of the manifold; the air manifold being intended to supply extracted air to the air conditioning system ECS;

said at least one air manifold is connected to at least one part of the configured arms and is itself configured to collect the air extracted and routed by said configured arms; said at least one air manifold thus includes as many openings communicating with the configured arms as the turbojet has configured arms;

said at least one air manifold is arranged at the periphery of the configured arms of said at least one part of the configured arms; said at least one air manifold therefore does not necessarily extend 360°, but extends circumferentially so as to connect the configured arms;

said at least one air manifold extends circumferentially over an angular sector corresponding substantially to that covered by the circumferential distribution of the configured arms;

said at least one air manifold is arranged downstream of the leading edge of the configured arms of said at least one part of the configured arms.

BRIEF DESCRIPTION OF THE DRAWINGS

Other features and advantages of the object of the present disclosure will be revealed from the following description of embodiments, given by way of non-limiting examples with reference to the appended figures.

DETAILED DESCRIPTION

Figure 1:
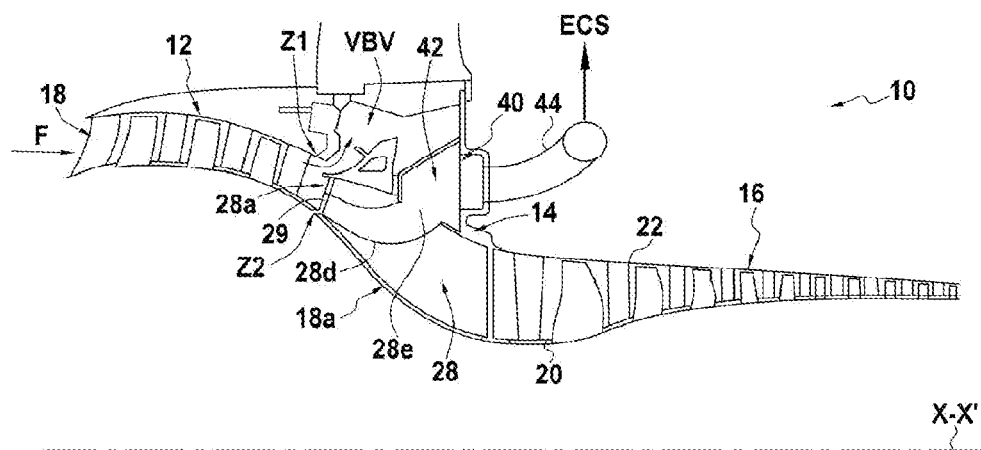
FIG. 1 is a partial schematic view in longitudinal section of an embodiment of a turbojet according to the invention, of which only a part above the longitudinal axis XX' of the turbojet is shown.

FIG. 1 shows a portion of an aircraft turbojet 10 according to one embodiment of the invention. A turbojet of this type has a general longitudinal shape centered around a longitudinal axis XX'. In the longitudinal section of FIG. 1, only the upper part located above the axis XX' is shown, the lower part not having been shown. The portion of the turbojet shown illustrates a local internal area of the turbojet in which the invention has been placed so as to modify the configuration of this internal area.

As shown in FIG. 1, in this area the turbojet 10 comprises in succession, from upstream to downstream in the circulation direction of a primary air stream illustrated by the arrow F (this air stream originates in the air inlet of the turbojet), a low-pressure (BP) casing or spool 12 containing in particular a compressor and a low-pressure turbine (only the blades are visible in FIG. 1), an intermediate casing or spool 14 and a high-pressure (HP) casing or spool 16 containing in particular a compressor and a high-pressure turbine (only the blades are visible in FIG. 1). These three casings 12, 14 and 16 are aligned entirely in the longitudinal direction of the axis XX'.

Figure 2:
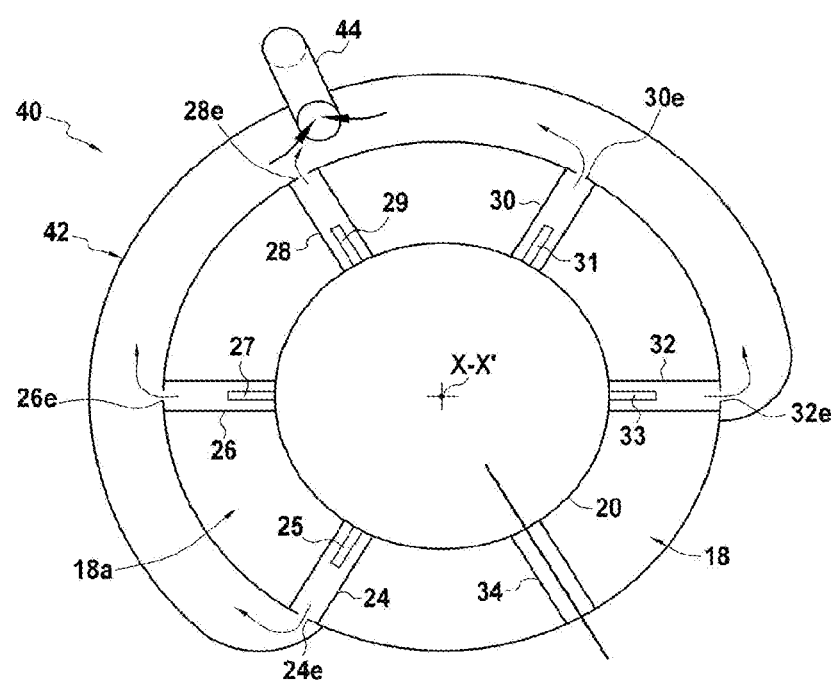
FIG. 2 is a schematic view in transverse section relative to the axis XX' showing the arrangement of an extracted air manifold on the periphery of a plurality of radial extraction arms used in the turbojet of the embodiment of FIG. 1 for extracting air.

These casings 12, 14 and 16 are internally configured so as to jointly delimit an internal annular passage 18 for the circulation of the primary air stream from upstream to downstream, from the upstream casing 12 to the downstream casing 16. This internal annular passage 18, of which only the upper part is shown in FIG. 1, has a generally axisymmetric shape around the longitudinal axis XX' as illustrated in FIG. 2. The passage 18 is bordered inside and outside by two respective shells 20 (central hub which defines the wall with the smallest radius) and 22 (wall with the largest radius often called a casing) which define its contour.

The internal annular passage 18 includes a portion or slice of the annular passage called a "gooseneck" 18a, located in the intermediate casing 14 and which defines, for the primary air stream circulating in the passage, a transition zone between the low-pressure 12 and high-pressure 16 casings.

The intermediate casing 14 comprises an air discharge system VBV which is able to extract air, downstream of the low-pressure compressor, from the primary air stream circulating in a first zone Z1 of the gooseneck 18a and to discharge it outside the annular passage, for example into the secondary stream of the turbojet, not shown here. In FIG. 1, a rising arrow illustrates the air extraction carried out in the first zone Z1 of the gooseneck, located in the upper part of the annular passage portion (near the external shell 22 of the annular passage 18) but not the discharge of the extracted air. The components (air extraction valve(s), . . . ) of the mechanism of this VBV system known per se are not shown, except for a cavity called the "VBV cavity" located above the gooseneck 18a and which receives the air extracted in zone Z1.

As shown in FIG. 2, the intermediate casing 14 comprises, arranged in the gooseneck 18a and downstream of the first air extraction zone Z1 of the air discharge system VBV, a plurality of arms 24, 26, 28, 30, 32, 34 which extend radially relative to the longitudinal axis XX' and which are distributed circumferentially along the annular disposition of the annular passage portion formed by the gooseneck 18a. FIG. 1 illustrates, in longitudinal section, a part of the internal configuration of the arm 28 which is not visible in the other figures.

The intermediate casing 14 also comprises an air extraction system 40 which is able to extract air from the primary air stream circulating in a second zone Z2 of the gooseneck 18a, distinct from the first zone Z1 and situated downstream of it, to supply it to an air conditioning system called ECS, not shown here, of the aircraft equipped with the turbojet. The air extraction system 40 is located entirely downstream of the air discharge system VBV in the intermediate casing 14 and each of the two systems defines a distinct air pathway.

The radial arms illustrated in FIGS. 1 and 2 do not all have the same function in this embodiment. In fact, the arms 24 to 32 have a particular configuration which is dedicated to the extraction of air from the air extraction system 40 and which allows in particular extracting, and routing within these arms, air from the primary air stream which circulates in the second zone Z2. These arms which have this particular configuration are called extraction arms. The arm 34, for its part, does not have a configuration of this type. It does however provide the known function of structural support and is called a radial arm (RDS). The number of arms having a dedicated configuration can vary from one embodiment to another. In the present embodiment, the total number of arms is six, but it can for example vary between 3 and 12. The number of arms used for the function of air extraction generally does not reach the total number of arms of the intermediate casing, and it is generally at most N-1 arms, for example so that one arm is assigned to the utilities (examples: RDS, channels) to facilitate integration.

The function of extracting air from the extraction arms (dedicated to the air extraction system 40) is provided by the presence of an inlet or air extraction slot which is arranged, here, at the leading edge of the arms in question 24 to 32, in the second zone Z2, and which is independent of the upstream air extraction of the VBV system carried out in the first zone Z1. The dynamic pressure of the air extracted at this location (second zone Z2) is thus maximized.

Each of the respective slots 25, 27, 29, 31, 33 of these arms extends radially, along the radial extension of the arms 24 to 32, from the base of the latter which is located on the internal shell or central hub 20, as illustrated in FIG. 2. The air extracted through these slots (second zone Z2) is that which flows in the gooseneck 18a along the wall of the shell 20 (internal stream) and is thus less polluted than the air extracted by the air discharge system VBV upstream and rather in the upper part of the primary air stream (first zone Z1). The air extracted through the slots (second zone Z2) is thus circumferentially distributed in the gooseneck at the base of the extraction arms. More particularly, each extraction slot extends over a distance which represents between 30 and 70% of the total radial extension of the arm in which it is provided from the base of the extraction arm in question (30 and 70% of the height of the air stream), which allows limiting the air intake to a less polluted zone of the primary air stream. The slots integrated with the extraction arms thus depart from a zone located in the internal stream of the flow and are therefore "robust" with respect to particles. The slots integrated with the extraction arms allow further recovery of dynamic pressures than if the air extraction had taken place in a manner not integrated with the arms, for example upstream of the arms. The head loss of the intermediate casing 14 is thus relatively reduced compared to air extraction configurations which are not integrated with the arms.

Figure 3:
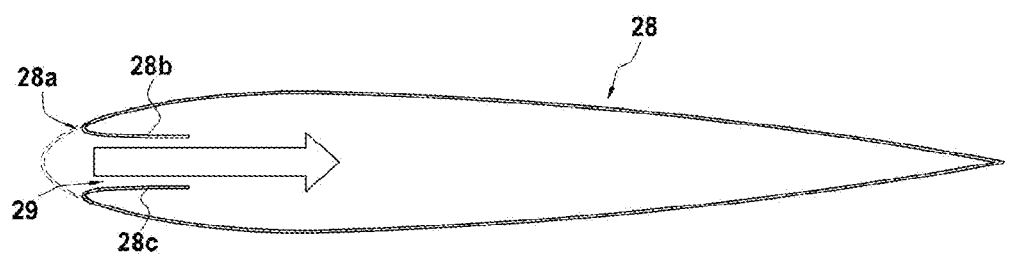
FIG. 3 is a schematic view in transverse section of the external profile of a radial arm used in the turbojet of the embodiment of FIG. 1 for extracting air.

The external profile of one of the arms configured to extract air from the primary air stream, for example the arm 28 of FIG. 1, is shown in FIG. 3 which is a transverse section view relative to the radial extension direction of the arm (the internal configuration of the arm is not shown in FIG. 3). The profile is substantially that of an aircraft wing, the leading edge 28a of which has been locally modified (in the height or radial extension direction of the slot as defined above) to provide in it the air extraction slot 29. The conventional profile of the leading edge is shown as a dotted line in FIG. 3.

The modified leading edge 28a locally assumes the shape of two mutually parallel air inlet lips 28b, 28c facing one another. The two lips 28b, 28c are spaced from one another (in a direction of the plane of FIG. 3 which is perpendicular to the direction connecting the leading edge to the trailing edge of the profile), so as to provide between them an opening of the given width. The two lips 28b, 28c extend perpendicular to the plane of FIG. 3, i.e. radially along the radial extension of the arm and from its base, so as to form the radial extension slot 29 which allows extracting air from the primary air stream (second zone Z2) and making it penetrate into the arm. The two lips 28b, 28c also extend, in the direction connecting the leading edge to the trailing edge of the profile, over a sufficient length (axial distance) to channel the extracted air as illustrated by the horizontal arrow in FIG. 3.

Each of the configured arms 24 to 32 of the air extraction system 40 comprise an internal routing duct (internal duct 28d in FIG. 1 for the arm 28) to route the extracted air through their slot (slot 29 for the arm 28) inside the arm in question, to an outlet opening belonging to it which is located opposite to the base of the arm (here the opening 28e for the arm 28 in FIGS. 1 and 2). The internal air routing ducts of the arms are not shown in FIG. 2. Only the inlet or extraction slots 25, 27, 29, 31 and 33 and the outlet openings 24e, 26e, 28e, 30e and 32e of the arms are shown in FIG. 2.

As shown in FIGS. 1 and 2, the air extraction system 40 comprises at least one air manifold 42 which is connected to at least one part of the configured arms 24 to 32 and which itself is configured to collect the air extracted and routed by these arms. In the embodiment described, a single manifold 42 is used in the air extraction system 40 to collect the air which is extracted by the slots 25 to 33 of the set of arms 24 to 32 and routed by the latter to their respective peripheral outlet openings 24e to 32e.

Said at least one air manifold, here the single manifold 42, is arranged at the external periphery of the configured arms 24 to 32, and thus extends circumferentially over an angular sector corresponding substantially to that covered by these arms, as illustrated in FIG. 2. The use of all the arms 24 to 32, with the exception of the radial arm 34, to extract air, allows maximizing the extraction cross section as well as the angular extension of the manifold. In one variant, not shown, a limited number of arms can be used for extracting air. By way of an example, it can be contemplated to use one arm out of two for extraction or using arms distributed over a given angular sector.

The manifold 42 assumes for example the shape of a hollow peripheral chamber, located beyond the external shell 22 while moving away from the longitudinal axis in FIG. 1, and girdling a part of the gooseneck 18a as viewed in transverse section like that of FIG. 2. The manifold 42 is connected to the arms 24 to 32 so as to be in fluid communication with the internal routing ducts of said arms by means of their respective outlet openings 24e to 32e.

Here the air manifold 42 is arranged downstream of the leading edge of the configured arms, as shown in FIG. 1 with the arm 28. This arrangement allows taking into account the local configuration of the discharge system VBV, the cavity VBV of which is substantially positioned directly above the arm 28 in FIG. 1. Thus generally, the assembly formed by the air extraction arms and the air manifold(s) is entirely located downstream of the discharge system VBV, regardless of the number of manifolds as well as the number and arrangement of the extraction arms.

Generally, the air manifold is fluidly isolated from the discharge system VBV, particularly from the cavity VBV, i.e. the structure of the air manifold (and its connection with the extraction arms) is designed to be sealed/hermetic with respect to fluids with respect to the adjacent cavity VBV. This makes it possible to ensure that the air extracted by the air discharge system VBV and present in particular in the cavity VBV (this air is relatively polluted by ice, sand and other pollutants and is in any case generally more polluted than the air extracted by the system 40; in fact, the position of the extraction near the hub avoids the extracted air being polluted due to a centrifugal effect driving debris toward the external wall) cannot penetrate into the air manifold of the air extraction system 40 to then be used in the air conditioning system ECS. Thus, the fluid isolation of the air manifold with respect to the discharge system VBV allows ensuring that there is no fluid interference between the two systems, particularly from their respective air extraction zones Z1 and Z2. In fact, from the moment where the air is extracted in the second zone Z2 of the gooseneck 18a by the extraction arms, this air is routed into these arms, then into the manifold and does not enter into contact with the outside air of the extraction system 40, particularly with air extracted by the discharge system VBV.

The air extraction system 40 also comprises a channel 44 which connects the manifold 42 to the air conditioning system ECS, not shown. The channel 44 extends downstream of the manifold as illustrated in FIG. 1 and gathers the air collected by the manifold originating in the extracting arms (picking arms), as illustrated by the arrows of FIG. 2. It will be noted that all that has been mentioned above about the air manifold applies to several air manifolds.

Figure 4:
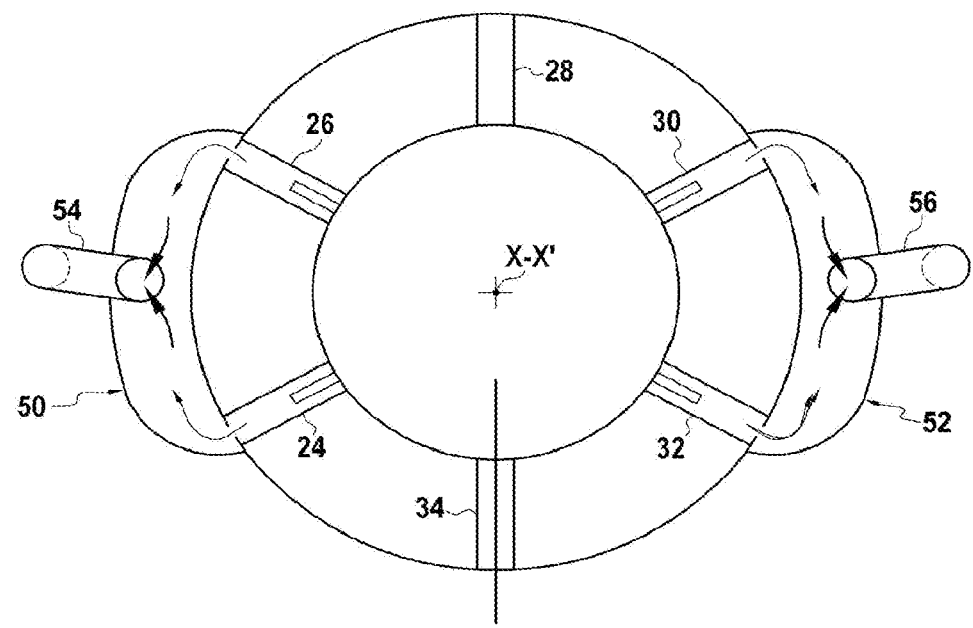
FIG. 4 is a schematic view of a variant embodiment of the arrangement of FIG. 2.

FIG. 4 shows a variant embodiment of the transverse section of FIG. 2 with the same total number of arms but with two independent air manifolds 50, 52 instead of a single one. Each of the two air manifolds 50, 52 is connected to several arms which are located along disjoint angular sectors. By way of an example, the manifold 50 is connected to two extraction arms 24, 26 and the manifold 52 is connected to two extraction arms. In this variant, the arm 28, diametrically opposed with respect to the radial arm 34, is not configured like the arms 24, 26, 30 and 32, with an extraction slot and an internal duct for routing the extracted air, and is therefore not used for air extraction.

Here each manifold 50, 52 is connected to a respective channel 54, 56. The two channels 54, 56 join at a common channel (not shown) which is connected to the air conditioning system ECS, not shown.

Aside from these differences, the description of the embodiment of FIGS. 1 to 3 applies to this variant.

In the embodiment described and in its variants, the air extraction system 40 and the air discharge system VBV are independent from one another structurally and functionally and are in particular implemented/actuated at different times according to the flight phases of the aircraft.

It is worth noting that at a high flow rate, when the extraction of air by the system 40 is in progress, the effect of the presence of the arms in the air stream of the gooseneck is limited. Flow separations at the foot of the air stream of the gooseneck are limited, which limits the inlet distortion of the HP compressor and improves its performance.

In the embodiment described and in its variants, the turbojet is of the two-spool type. The turbojet can, however, be of the three-spool type. The turbojet can be of the type equipped with a fan (turbofan) or be a jet engine equipped with a propeller.

Although the present invention refers to specific exemplary embodiments, modifications can be applied to these examples without departing from the general scope of the invention as defined by the claims. In addition, the individual characteristics of the different embodiments illustrated or mentioned can be combined into additional embodiments. Consequently, the description and the drawings can be considered in an illustrative, rather than a restrictive sense.

The invention claimed is:

1. An aircraft turbojet comprising, in succession, from upstream to downstream in a circulation direction of a primary air stream:
    a low-pressure casing, an intermediate casing and a high-pressure casing which are aligned entirely in a longitudinal direction, the low-pressure, intermediate and high-pressure casings jointly delimiting an internal annular passage for circulation of the primary air stream from upstream to downstream, the intermediate casing comprising a portion of said internal annular passage which is called a gooseneck portion, the intermediate casing comprising:
    an air discharge system which is able to extract air from the primary air stream circulating in a first zone of the gooseneck portion and to discharge the air outside of the internal annular passage,
    an air extraction system which is able to extract the air from the primary air stream circulating in a second zone of the gooseneck portion, the extracted air being intended for an aircraft air conditioning system, the second zone being located downstream of the first zone, and
    in the gooseneck portion are a total number of arms which each extend radially and with a circumferential distribution in the gooseneck portion when viewed in a transverse plane relative to the longitudinal direction, the total number of arms is divided into at least one first set of the arms and at least one second set of the arms, each of the at least one second set of the arms is a different set from each of the at least one first set of the arms,
    the air extraction system comprising the at least one first set of the arms, each arm of the at least one first set of the arms is configured to extract the air from the second zone by at least one slot in a leading edge of the arm and to route the extracted air, said at least one slot extending from a base of the arm in a radial extension direction over a distance which represents between 30% and 70% of a total radial extension of the arm,
    wherein the air extraction system comprises at least one air manifold which is fluidly isolated from the air discharge system,
    wherein each of said at least one air manifold is connected to a respective one of the at least one first set of the arms and is configured to collect the air extracted and routed by said respective one of the at least one first set of the arms,
    wherein each of said at least one air manifold extends circumferentially over a respective angular sector less than 360° which corresponds to a respective first circumferential extent of the respective one of the at least one first set of the arms, and
    wherein in the gooseneck portion, each arm of the at least one second set of the arms provides structural support and is located within a respective second circumferential extent adjacent to each first circumferential extent, and each arm of the at least one second set of the arms is not configured to extract the air from the second zone.

2. The aircraft turbojet according to claim 1, wherein said at least one air manifold is arranged downstream of the leading edge of each arm of the at least one first set of the arms.

3. The aircraft turbojet according to claim 1, wherein the internal annular passage is bordered radially inward by an internal shell and is bordered by an external shell spaced radially outward of the internal shell, the first zone being located near the external shell and the second zone being along the internal shell.

4. The aircraft turbojet according to claim 1, wherein the air discharge system is located radially outward of at least one of the total number of arms.

5. The aircraft turbojet according to claim 1, wherein, when viewed in transverse section relative to the radial extension direction of each arm of the at least one first set of the arms, the respective leading edge of each arm of the at least one first set of the arms locally assumes a shape of two facing parallel inlet lips which are spaced from one another so as to provide a respective slot of the at least one slot between the two facing parallel inlet lips which extend axially over a predetermined axial length into the respective arm.

6. The aircraft turbojet according to claim 1, wherein each arm of the at least one first set of the arms comprises an internal routing duct to route the extracted air to an outlet opening.

7. The aircraft turbojet according to claim 1, wherein each of said at least one air manifold is arranged at a radially outer periphery of the respective one of the at least one first set of the arms.

* * * * *